United States Patent [19]
Wilfong

[11] Patent Number: 5,898,156
[45] Date of Patent: Apr. 27, 1999

[54] VALIDATION STAMPS FOR ELECTRONIC SIGNATURES

[75] Inventor: Gordon Thomas Wilfong, Gillette, N.J.

[73] Assignee: Lucent Technologies Inc., Murray Hill, N.J.

[21] Appl. No.: 08/697,753

[22] Filed: Aug. 29, 1996

[51] Int. Cl.⁶ .................................................. G06K 5/00
[52] U.S. Cl. ....................................... 235/380; 235/382.5
[58] Field of Search ................................... 235/380, 382, 235/382.5, 494; 382/3–5; 380/25, 23, 51; 902/3

[56] References Cited

U.S. PATENT DOCUMENTS

| | | | |
|---|---|---|---|
| 4,454,610 | 6/1984 | Sziklai | 382/2 |
| 4,944,532 | 7/1990 | Pollard | 283/70 |
| 5,150,420 | 9/1992 | Haraguchi | 235/380 |
| 5,157,726 | 10/1992 | Merkle et al. | 380/23 |
| 5,208,858 | 5/1993 | Vollert et al. | 380/43 |
| 5,367,573 | 11/1994 | Quimby | 380/25 |

FOREIGN PATENT DOCUMENTS

| | | | |
|---|---|---|---|
| 44 10 459 A1 | 3/1994 | Germany | H04N 1/32 |
| 0224888 | 9/1989 | Japan | 902/3 |

OTHER PUBLICATIONS

European Search Report.
Y. Sato et al., "Online Signature Verification Based on Shape, Motion, and Writing Pressure," *Proceedings of the International Joint Conference on Pattern Recognition*, Munich, Oct. 19–22, 1982; Institute of Electrical and Electronics Engineers, 823–826, vol. 2 (Oct. 19, 1982).

*Primary Examiner*—Thien Minh Le

[57] ABSTRACT

The present invention describes a validation stamp for protecting the integrity of a signature affixed to an electronic document. The validation stamp of the present invention includes a validation body and a validation signature. The validation stamp is affixed to a signed document having a document body and a document signature. The document signature and the validation signature are derived from an electronic signature defined by geometric and timing information. Specifically, the validation signature includes the timing information, and possibly the geometric information, of the electronic signature, whereas the document signature includes the geometric information, and not the timing information, of the electronic signature. To verify the integrity of the signature on the electronic document, the validation signature is first decrypted and then compared, along with the document signature, against the signed document and geometric and timing information of a signature known for the authorized signator of the electronic document.

34 Claims, 3 Drawing Sheets

VALIDATION STAMPS FOR ELECTRONIC SIGNATURES

FIELD OF THE INVENTION

The present invention relates generally to the field of electronic documents and, more particularly, to signature verification on electronic documents.

BACKGROUND OF THE INVENTION

In certain instances, office work productivity has significantly increased through advances in technology. Some of these advances in technology involve replacing paper documents in the workplace with electronic documents. One such advance provides office workers with the ability to send/receive and share documents electronically. Traditionally, many paper documents contain signatures to show authorship or indicate approval. Accordingly, it is also desirable to include signatures in the electronic documents, particularly when they are sent back and forth. As would understood, the inclusion of signatures in the electronic documents is easily achieved using graphic tablets, for example, which are computer peripheral devices for capturing handwritten data.

Once a signature is affixed to a document, people generally assume that the signature on a paper or electronic document is proof of authorship or approval. There is no guarantee, however, that the integrity of the signature, especially electronic ones, has not been compromised, for example, by being traced or otherwise forged. Generally, signatures on paper or electronic documents are vulnerable to two forms of deception. The first form of deception involves an invalid signature. An invalid signature is a signature created by a forger attempting to imitate the signature of another person, i.e., authorized signator. Such a signature is affixed on a document not authored or approved by the authorized signator. The second form of deception involves affixing a valid signature, which is a signature actually created by the authorized signator, on a document other than the original intended document. This form of deception, referred to herein as an invalid copy, is particularly difficult to detect when the signature has been "cut" from one electronic document and "pasted" onto a second electronic document since it looks exactly like the original signature.

For the aforementioned reasons, a number of people have reservations about allowing their signature to be captured electronically. Accordingly, there exists a need for protecting the integrity of a signature on an electronic document.

SUMMARY OF THE INVENTION

The present invention describes a validation stamp that protects the integrity of a signature affixed to an electronic document. Specifically, the validation stamp protects against deceptions relating to invalid copies and invalid signatures.

In one embodiment, the validation stamp of the present invention protects signed documents comprising a document body and a document signature against invalid copies and invalid signatures. The validation stamp is encrypted and includes a validation signature and a validation body, which is identical to the document body or portions thereof when created. The document signature and the validation signature are derived from an electronic signature captured using a graphics tablet, wherein the electronic signature is defined by geometric information and timing information. Specifically, the validation signature is derived using the timing information, and possibly the geometric information, associated with the electronic signature, and the document signature is derived using only the geometric information associated with the electronic signature. In a preferred embodiment of the present invention, the geometric information used to derive the document signature is modified such that possible reconstruction of the timing information from the original geometric information is prevented.

The integrity of the signature affixed to the electronic document is verified by decrypting the validation stamp and comparing the decrypted validation stamp and, in some instances, the document signature against the document body and the geometric and timing information associated with a signature known for an authorized signator. Specifically, the validation body is compared to the document body to determine whether the authorized signator originally intended to affix his or her signature to the electronic document, and the geometric information and the timing information contained within the electronic document are compared to the geometric and timing information associated with the signature known for the authorized signator to determine whether the signature on the electronic document is a valid signature. The signed document is a valid copy if the validation body is identical to the document body or predetermined portions thereof. The signature is a valid signature if its geometric and timing information coincide within a predetermined error distance of the geometric and timing information of the signature known for the authorized signator.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

The present invention is a validation stamp that protects the integrity of a signature on an electronic document. Specifically, the present invention protects against deceptions relating to invalid copies and invalid signatures, as will be described herein.

Figure 1:
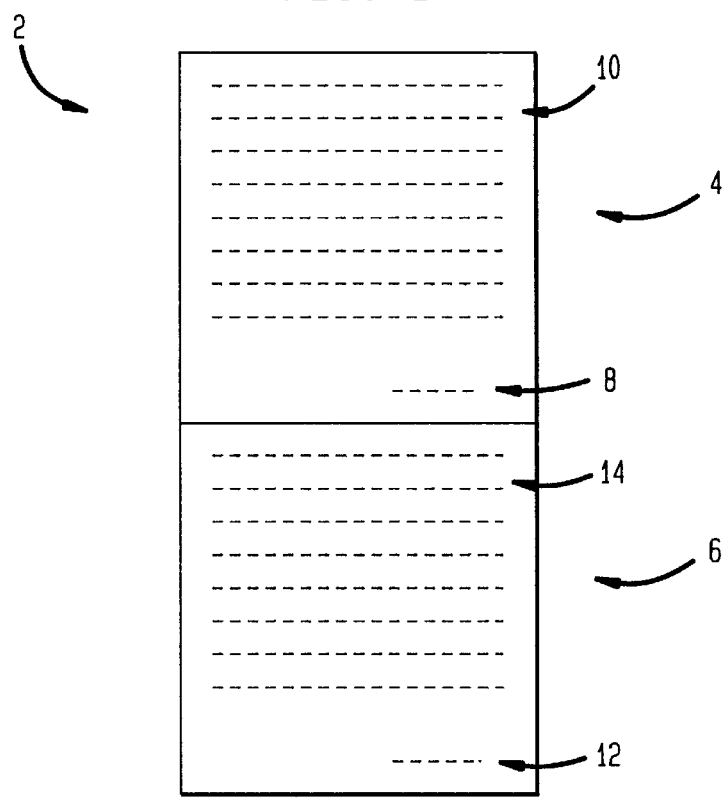
FIG. 1 illustrates an electronic document E comprising a signed document D and a validation stamp V in accordance with the present invention.

Referring to FIG. 1, there is illustrated an electronic document E 02 comprising a signed document D 04 and a validation stamp V 06 in accordance with the present invention, i.e., E=(D,V). As shown in FIG. 1, the signed document D 04 is accessible to recipients of the electronic document E 02, and includes a document body $B_D$ 10 consisting of textual and/or graphical information and a document signature $S_D$ 08 to indicate authorship or approval of the document body $B_D$ 10, i.e., $D=(S_D,B_D)$.

The validation stamp V 06 provides a mechanism for verifying the integrity of the document signature $S_D$ 08 in the signed document D 04, and includes a validation signature $S_V$ 12 and a validation body $B_V$ 14, which is the same as the document body $B_D$ 10. Thus, $V=(S_V,B_V)=(S_V,B_D)$. In an alternate embodiment of the present invention, the validation body $B_V$ 14 contains predetermined portions or segments of the document body $B_D$ 10 in lieu of the entire document body $B_D$ 10.

Unlike the signed document D 04, the validation stamp V 06 is encrypted using an encoding algorithm and is therefore unaccessible to the recipients of the electronic document E 02. Encoding algorithms, such as the Digital Signature Algorithm (DSA) standard, are well-known in the art. See American National Standards Institute (ANSI), "Working Draft X9.30-199X: Public Key Cryptography Using Irreversible Algorithms for the Financial Services Industry: Part I: The Digital Signature Algorithm (DSA)," American Bankers Association, Washington, D.C., Mar. 4, 1993.

The document signature $S_D$ 08 and the validation signature $S_V$ 12 are derived from a signature captured by a device operable to electronically record the positions of a writing device, such as a pen, on the device at given times. Such devices are referred to herein as graphics tablets, and are well-known in the art. As would be understood, the term "graphics tablet" should not be construed to limit the present invention in any manner in that other known methods of electronically capturing a signature may also be utilized. For the purposes of this application, signatures captured electronically using a graphics tablet are referred to herein as "electronic signatures," while signatures written with an ink pen on paper documents or captured electronically by a means other than a graphics tablet are referred to herein as "paper signatures."

Electronic signatures have associated with them two types of information which the present invention utilizes to determine whether the integrity of a signature on an electronic document has been compromised: geometric information $S_g$ and timing information $S_t$. The geometric information $S_g$ describes the geometric signature features, i.e., shape of the signature, and is captured by the graphics tablet as a sequence of points $(p_1, \ldots, p_n)$. Each point has (x,y) coordinates.

The timing information $S_t$ defines the moment each of the points $(p_1, \ldots, p_n)$ are recorded electronically by the graphics tablet with reference to each other. Thus, for each point $p_i$ comprising the geometric information $S_t$ of an electronic signature, there is associated a $(x_i, y_i)$ coordinate and a time $t_i$, i.e., $p_i = (x_i, y_i, t_i)$. The timing information $S_t$ used to derive dynamic signature features of the signator, such as the motion or speed of a writing device as a signator writes each letter of his or her name on the graphics tablet. The dynamic signature features are not apparent from a copy of the signature.

The geometric information $S_g$ and the timing information $S_t$ play somewhat complementary roles in distinguishing genuine signatures from forgeries, i.e., the more forgers try to match every detail of a signature's shape, the less likely they are to match its dynamic signature features, and vice-versa. In contrast to electronic signatures, paper signatures have associated geometric information $S_g$ only, whereby the absence of the timing information makes such signatures more vulnerable to forgery.

The validation signature $S_V$ 12 is derived using the electronic signature and contains the timing information $S_t$ and possibly the geometric information $S_g$. In contrast, the document signature $S_D$ 08, which is also derived using the electronic signature S, contains only the geometric information $S_g$—that is, the geometric information $S_g$ is isolated or the timing information $S_t$ is removed from the electronic signature in order to create the document signature $S_D$. Thus, the document signature $S_D$ is equivalent to a paper signature. Since the document signature $S_D$ contains only the geometric information $S_g$ and the validation stamp V 06 is encrypted, the timing information $S_t$ is hidden from the recipients of the electronic document E 02, thereby preventing access to the dynamic signature features for imitation by a forger.

The basic assumption that enables the success of the present invention is that the timing information $S_t$ is concealed. However, this may not be the case, for instance, if the graphics tablet samples the position of the writing device at regular time intervals $I_n$. In such a situation, the timing information $S_t$ could be easily reconstructed from the geometric information $S_g$ using the formula $t_i=(i-1)*I_n$. In order to hide the timing information $S_t$ and prevent its reconstruction from the geometric information $S_g$, the geometric information $(p_1, \ldots, p_n)$ is modified before being recorded as the document signature $S_D$. For example, the document signature $S_D$ could be computed by simply re-sampling the raw geometric information $(p_1, \ldots, p_n)$ to produce modified geometric information $(p_1', \ldots, p_n')$ where adjacent points $p_i'$ are equal arc-length distances from each other. Another example involves interpolating a random number of chosen points between adjacent points of the raw geometric information $(p_1, \ldots, P_n)$.

In general, signatures on electronic documents are subject to two forms of deception: invalid copy and invalid signature. An invalid copy is a signature that was actually produced by the authorized signator, i.e., valid signature, for a document other than the one on which the signature is currently affixed. In other words, the invalid copy of the signature is not on the document which the authorized signator originally affixed his or her signature. For example, a valid signature may be "cut" from one electronic document and "pasted" onto a second electronic document. The second form of deception, i.e., invalid signature, involves a forger attempting to imitate the geometric and/or dynamic signature features associated with a signature of another person. This signature is also affixed to a document not authored or approved by the authorized signator.

The present invention electronic document E 02 is operable to resist both of the aforementioned forms of deception. In operation, an authorized signator or author A would create the electronic document E and send it to recipients R. The recipients R would have access to the signed document D, but not to the encrypted validation stamp V. To verify that the integrity of the signature on the electronic document was not compromised, the recipients R would run a validation routine which compares the validation body $B_V$ and the geometric information $S_g$ and the timing information $S_t$ contained within the electronic document against the signed document D and the geometric and timing information of a signature known for the author A.

Figure 2:
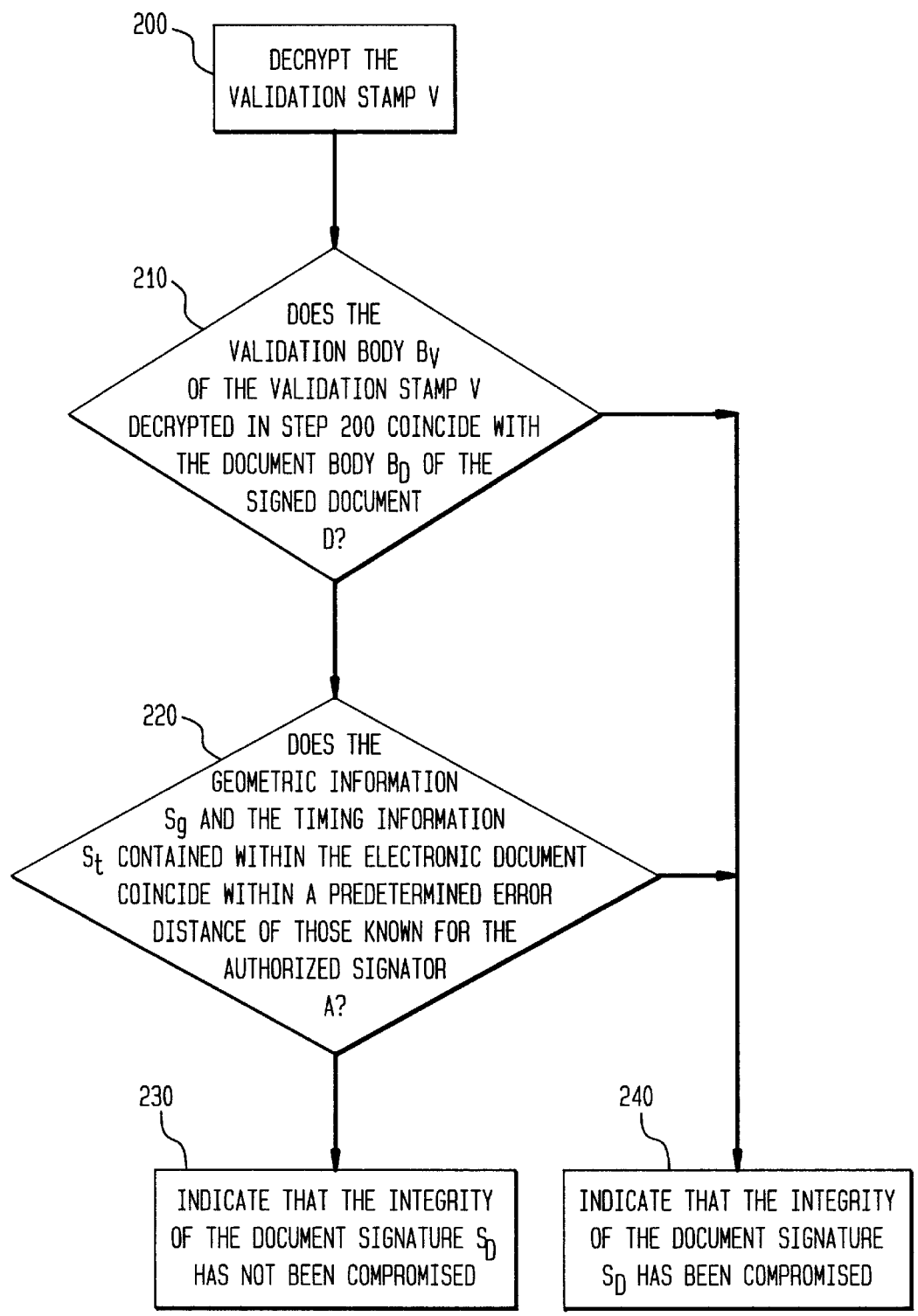
FIG. 2 illustrates a flowchart depicting the steps of an exemplary validation routine for validating the electronic document E of FIG. 1.

Referring to FIG. 2, there is illustrated a flowchart depicting the steps of an exemplary validation routine 20. As shown in FIG. 2, the validation routine 20, in step 200, decrypts the validation stamp V to access the encrypted validation body $B_V$ and the timing information $S_t$, and possibly the geometric information $S_g$, corresponding to the encrypted validation signature $S_V$. In step 210, the validation routine checks for the first form of deception, i.e., invalid copy, by comparing the decrypted validation body $B_V$ against the document body $B_D$ of the signed document D. If the decrypted validation body $B_V$ coincides with the document body $B_D$, then the validation routine 20 concludes that the document signature $S_D$ and the validation stamp V was not "cut" from another electronic document E and "pasted"

onto the electronic document E received—that is, the document signature $S_D$ is not an invalid copy. The validation routine 20 subsequently continues to step 220. Otherwise, the validation routine 20 proceeds to step 240 where the recipients R are informed that the integrity of the document signature $S_D$ on the electronic document E received has been compromised.

In step 220, the validation routine 20 checks for the second form of deception, i.e., invalid signature, using a signature verification algorithm to validate the signature on the electronic document. Signature verification algorithms are well-known in the art. See "Statistical Methods for On-Line Signature Verification" by Winston Nelson, William Turin and Trevor Hastie in the International Journal of Pattern Recognition and Artificial Intelligence, Volume 8, Number 3, 1994. In short, signature verification involves establishing statistical information about a number of features of a given person's signature, such as average time to write a signature, average speed of pen during signing, average number of strokes, etc. This statistical information is typically established during a training phase. To verify a particular instance of a signature, the signature verification algorithm measures the features of interest and statistically tests whether the results are similar within a predetermined error distance, such as Euclidean, to those obtained during the training phase.

In other words, the signature verification algorithm compares the timing information $S_t$ of the decrypted validation signature $S_V$ and the geometric information $S_g$ of the document signature $S_D$ (or decrypted validation signature $S_V$) against those known for the authorized signator A. If the geometric information $S_g$ and the timing information $S_t$ are similar within the predetermined error distance of the known geometric information $S_g$ and the timing information $S_t$ of the authorized signator, then the decrypted validation signature $S_V$ is determined to be actually produced by the authorized signator A, i.e., valid signature. The validation routine 20 subsequently continues to step 230 where it indicates to the recipients that the integrity of the document signature $S_D$ on the electronic document E received has not been compromised. Otherwise, the validation routine 20 proceeds to step 240 where it indicates that the integrity of the document signature $S_D$ on the electronic document E received has been compromised.

Figure 3:
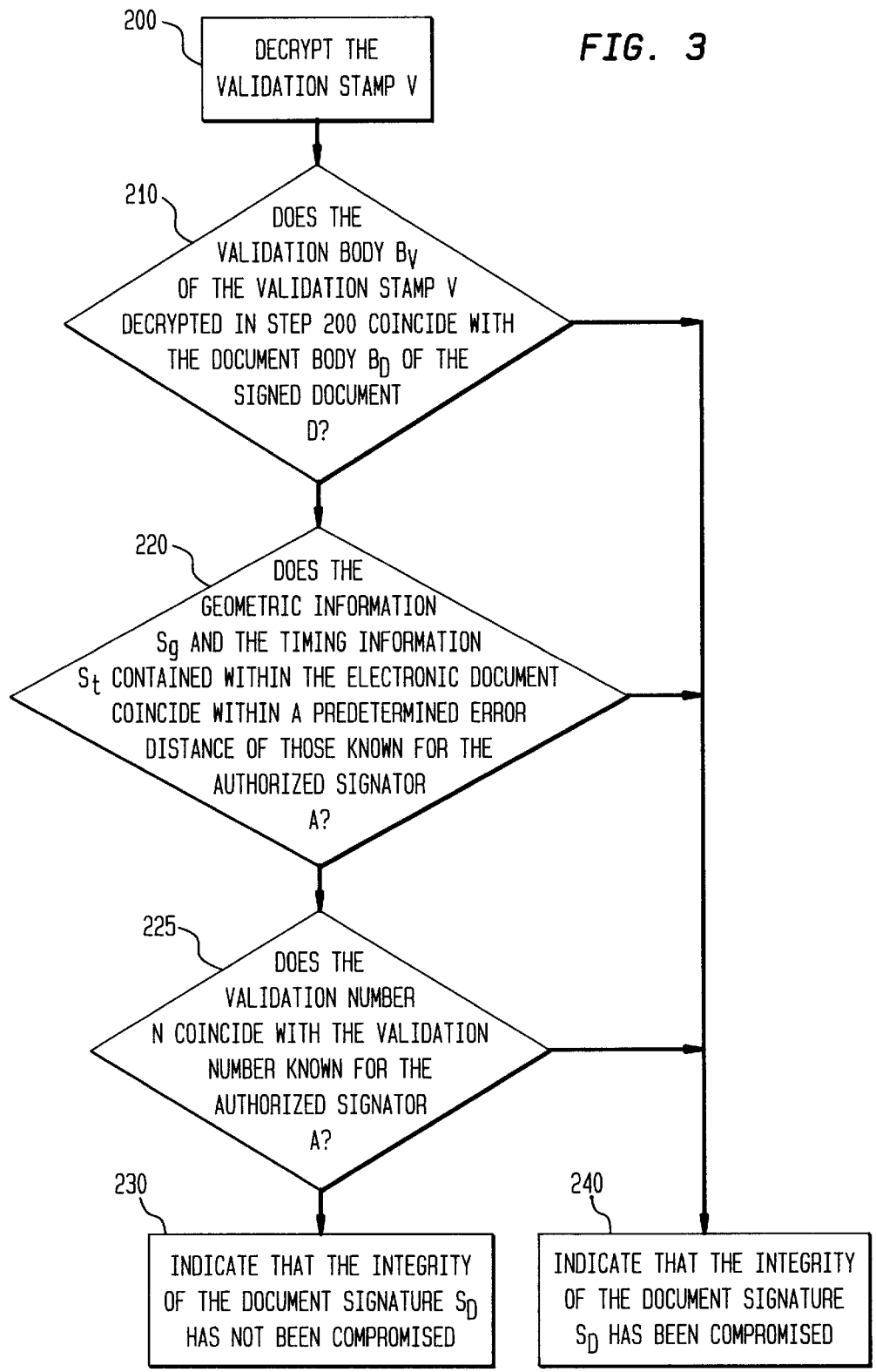
FIG. 3 illustrates the flowchart of FIG. 3 having an additional step for verifying validation numbers.

In another embodiment of the present invention, the validation stamp V further includes a validation number N for providing additional protection against invalid signatures, wherein each validation number N comprises a sequence of characters which can be used to uniquely identify a person or other type of entity. Thus, if a forger is able to successfully imitate the geometric and dynamic signature features of another persons's signature, the forger must also know the authorized signator's associated validation number N. Referring to FIG. 3, there is illustrated a flowchart depicting the steps of the validation routine 20 having a step 225 for verifying the validation number N. In an alternate embodiment of the present invention, the validation number N is included in the validation stamp V in lieu of the timing information $S_t$.

Figure 4:
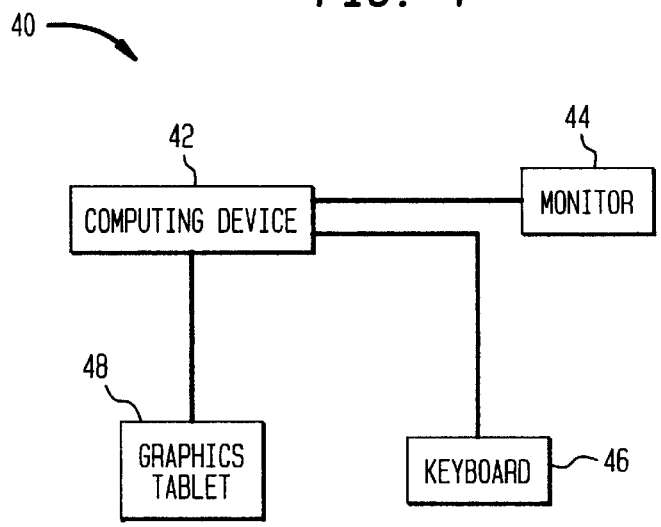
FIG. 4 illustrates one embodiment of a signature verification system in connection with the present invention.

Referring to FIG. 4, there is illustrated one embodiment of a signature verification system 40 in connection with the present invention as shown in FIG. 4, the electronic signature verification system 40 includes a computing device 42 for creating and verifying the electronic document E 02, a display 44 for providing a visual presentation, a keyboard 46 for providing typed input and a graphics tablet 48 for providing handwritten input. The display 44, the keyboard 46 and the graphics tablet 48 are electronically coupled to the computing means 42.

Although the present invention has been described in considerable detail with reference to a certain embodiment, other embodiments are also applicable. Therefore, the spirit and scope of the appended claims should not be limited to the description of the embodiment contained herein.

I claim:

1. A validation stamp for protecting the integrity of an electronic signature on a document, wherein said document includes a body and a document signature, said document signature including geometric information corresponding to said electronic signature, said validation stamp comprising:

a validation signature including timing information corresponding to said electronic signature for ensuring that said electronic signature is a valid signature; and a validation body identical to at least a portion of said document body for determining whether said electronic signature was originally intended for said document.

2. The validation stamp of claim 1, wherein said validation signature is encrypted such that said timing information is concealed from recipients of said document.

3. The validation stamp of claim 2, wherein said validation signature is decryptable for comparing said timing information of said validation signature against timing information known for an authorized signator of said electronic signature.

4. The validation stamp of claim 1, wherein said validation signature further includes said geometric information corresponding to said electronic signature.

5. The validation stamp of claim 4, wherein said validation signature is decryptable for comparing said timing information and said geometric information of said validation signature against timing information and geometric information known for an authorized signator of said electronic signature.

6. The validation stamp of claim 1, wherein said validation body is identical to entire contents of said document body.

7. The validation stamp of claim 1, wherein said validation body is identical to predetermined portions of said document body.

8. The validation stamp of claim 1, wherein said validation body is operable for comparing against said document body.

9. The validation stamp of claim 1 further comprising:

a document signature including geometric information corresponding to said electronic signature which has been modified such that said timing information corresponding to said electronic signature cannot be reconstructed from modified geometric information.

10. The validation stamp of claim 9, wherein said geometric information is modified such that adjacent points comprising said modified geometric information are equal arc-length distances from each other.

11. The validation stamp of claim 9, wherein said geometric information is modified such that a random number of chosen points are interpolated between adjacent points comprising said geometric information.

12. A method for protecting an electronic signature affixed to an electronic document comprising the steps of:

creating a signed document having a document body and a document signature; and assembling a validation stamp for said signed document, wherein said validation stamp includes a validation signature and a validation body.

13. The method of claim 12 comprising the additional step of:
appending said validation stamp to said signed document, wherein said validation stamp may be referenced to protect the integrity of said electronic signature on said electronic document.

14. A method for protecting an electronic signature affixed to an electronic document comprising the steps of:
creating an electronic signed document having a document body and a document signature; and
assembling an electronic validation stamp for said signed document, wherein said validation stamp includes a validation signature and a validation body, said validation body corresponding to at least a portion of said signed document.

15. The method of claim 14, wherein said geometric information is modified such that timing information corresponding to said geometric information cannot be reconstructed from modified geometric information.

16. The method of claim 15, wherein said modified geometric information includes adjacent points which are equal arc-length distances from each other.

17. The method of claim 15, wherein said modified geometric information includes a random number of chosen points interpolated between adjacent points comprising unmodified geometric information.

18. The method of claim 12 comprising the additional step of:
comparing said validation body against said document body to determine whether said electronic signature was originally intended by an authorized signator to be affixed to said electronic document.

19. The method of claim 12 comprising the additional step of:
comparing geometric information and timing information contained within said signed document and said validation stamp against geometric information and timing information of a signature known for an authorized signator to determine whether said signature is a valid signature.

20. The method of claim 12, wherein said validation signature includes geometric information describing geometric signature features of a signator of said electronic signature and timing information describing dynamic signature features of said signator of said electronic signature.

21. The method of claim 12 comprising the additional step of:
capturing a signature electronically using a graphics tablet operable to record positions of a writing device on said graphics tablet at given times.

22. The method of claim 21, wherein said step of creating said signed document includes:
deriving said document signature using geometric information of said electronic signature being captured electronically by said graphics tablet.

23. The method of claim 21, wherein said step of creating said signed document includes:
deriving said validation stamp using timing information of said electronic signature being captured electronically by said graphics tablet.

24. The method of claim 12 comprising the additional step of:
encoding said validation stamp such that said validation stamp is not accessible to recipients of said electronic document.

25. The method of claim 12, wherein said validation body is identical to said document body such that said validation body may be later compared to said document body for determining whether said electronic signature was originally intended by an authorized signator to be affixed to said electronic document.

26. The method of claim 12, wherein said validation body is identical to predetermined portions of said document body such that said validation body may be later compared to said document body for determining whether said electronic signature was originally intended by an authorized signator to be affixed to said electronic document.

27. The method of claim 12, wherein said validation signature includes timing information describing dynamic signature features of a signator of said electronic signature.

28. The method of claim 12, wherein said validation stamp includes a validation number identifiable with a signator to protect against deception.

29. A method for verifying the integrity of an electronic signature on an electronic document having a signed document and an encrypted validation stamp, said method comprising the steps of:
decrypting said validation stamp; and
comparing said validation stamp being decrypted against said signed document to determine whether said electronic signature was originally intended by an authorized signator to be affixed to said electronic document
wherein said signed document includes a document body and said validation stamp includes a validation body, and wherein said step of comparing said validation stamp includes:
comparing said validation body against said document body to determine whether said validation body coincides with said document body.

30. A method for verifying the integrity of an electronic signature on an electronic document having a signed document and an encrypted validation stamp, said method comprising the steps of:
decrypting said validation stamp;
comparing said validation stamp being decrypted against said signed document to determine whether said electronic signature was originally intended by an authorized signator to be affixed to said electronic document, wherein said signed document includes said document signature and said validation stamp includes a validation signature; and,
comparing timing information of said validation signature and geometric information of said document signature against geometric information and timing information of a signature known for an authorized signator to determine whether said electronic signature is a valid signature.

31. A method for verifying the integrity of an electronic signature on an electronic document having a signed document and an encrypted validation stamp, said method comprising the steps of:
decrypting said validation stamp;
comparing said validation stamp being decrypted against said signed document to determine whether said electronic signature was originally intended by an authorized signator to be affixed to said electronic document, wherein said validation stamp includes a validation signature; and,
comparing geometric information and timing information of said validation signature against geometric information and timing information of a signature known for an authorized signator to determine whether said electronic signature is a valid signature.

32. A method for verifying the integrity of an electronic signature on an electronic document having a signed document and an encrypted validation signature, said method comprising the steps of:

decrypting said validation signature; and comparing said validation signature being decrypted against timing information of a signature known for an authorized signator of said signed document to determine whether said validation signature is a valid signature.

33. The method of claim 32 comprising the additional step of:

comparing said validation signature being decrypted against geometric information of a signature known for an authorized signator of said signed document to determine whether said validation signature is a valid signature.

34. The method of claim 32, wherein said signed document includes a document signature, said method comprising the additional step of:

comparing said document signature against geometric information of a signature known for an authorized signator of said signed document to determine whether said validation signature is a valid signature.

* * * * *